United States Patent Office 3,316,926
Patented May 2, 1967

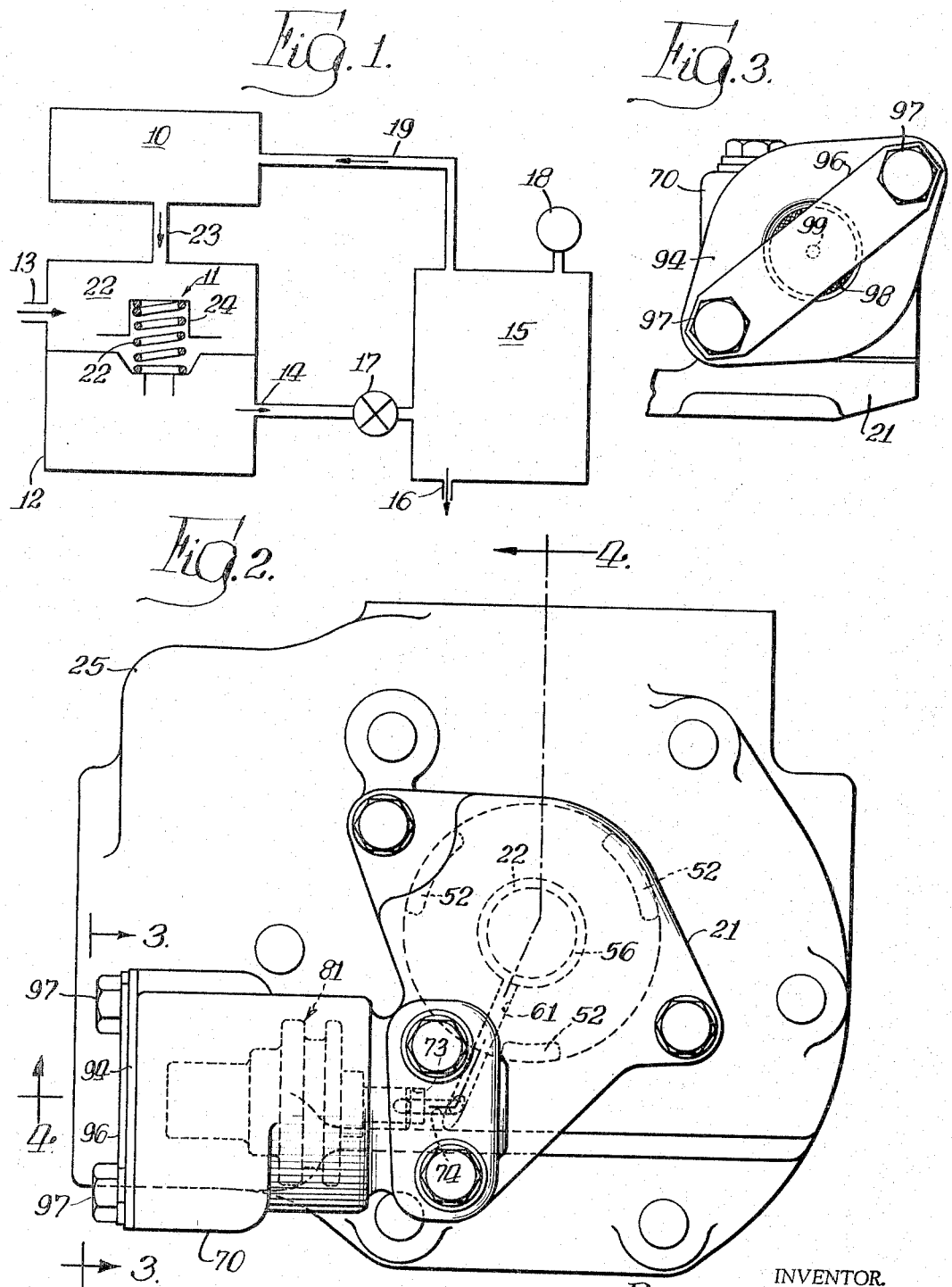

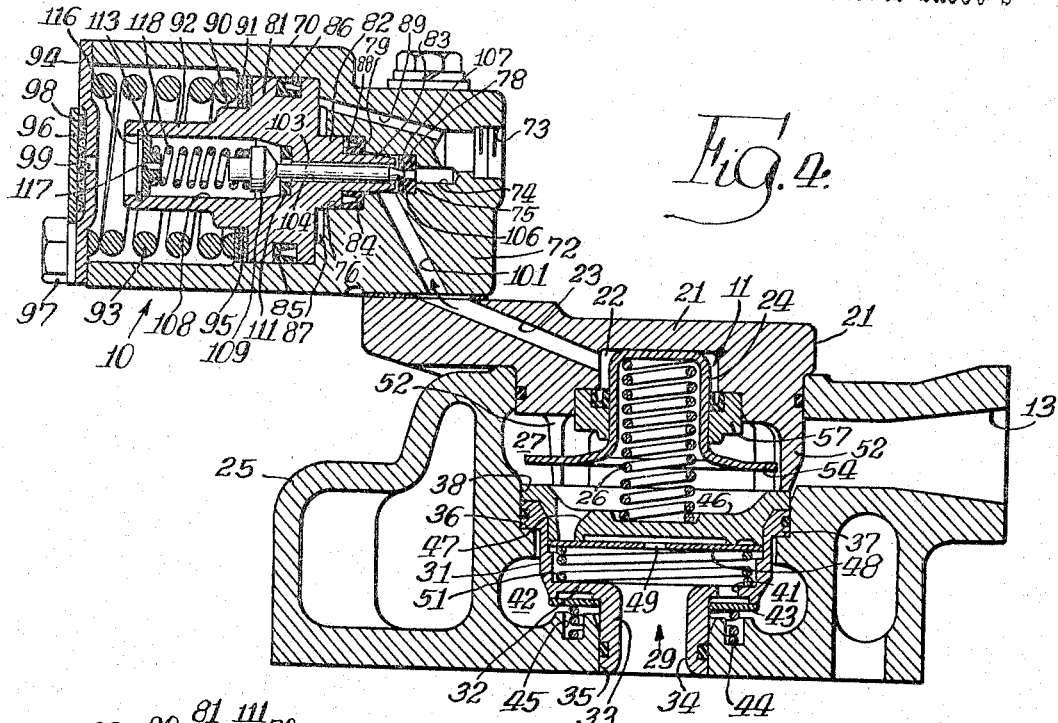
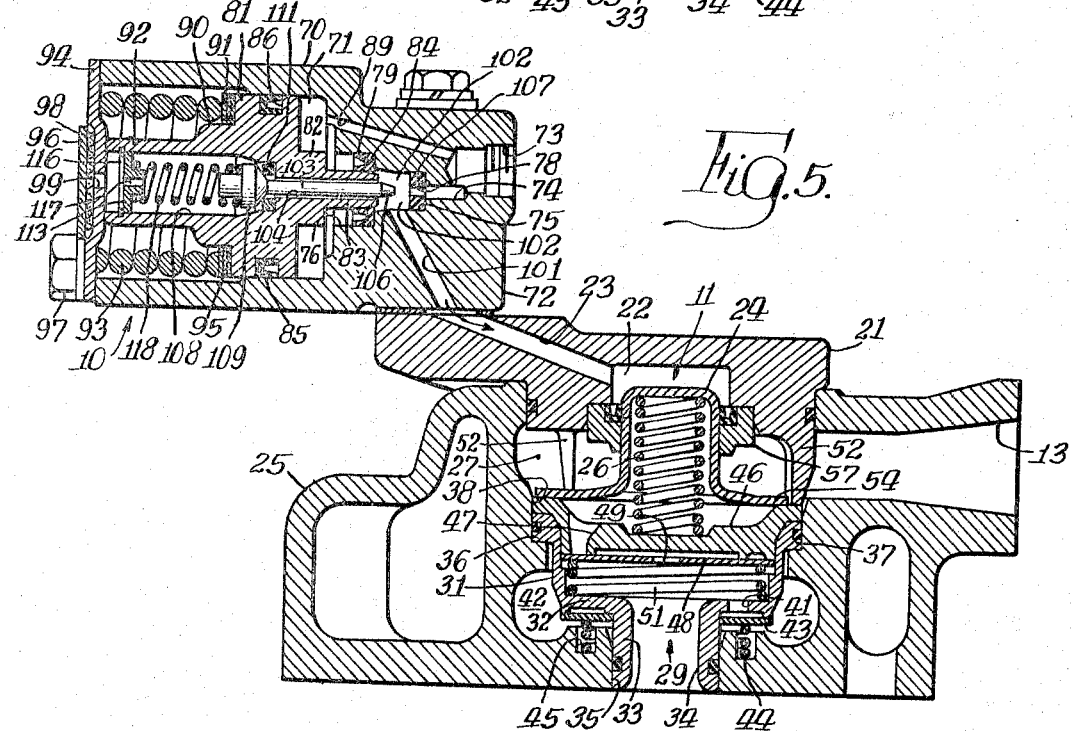

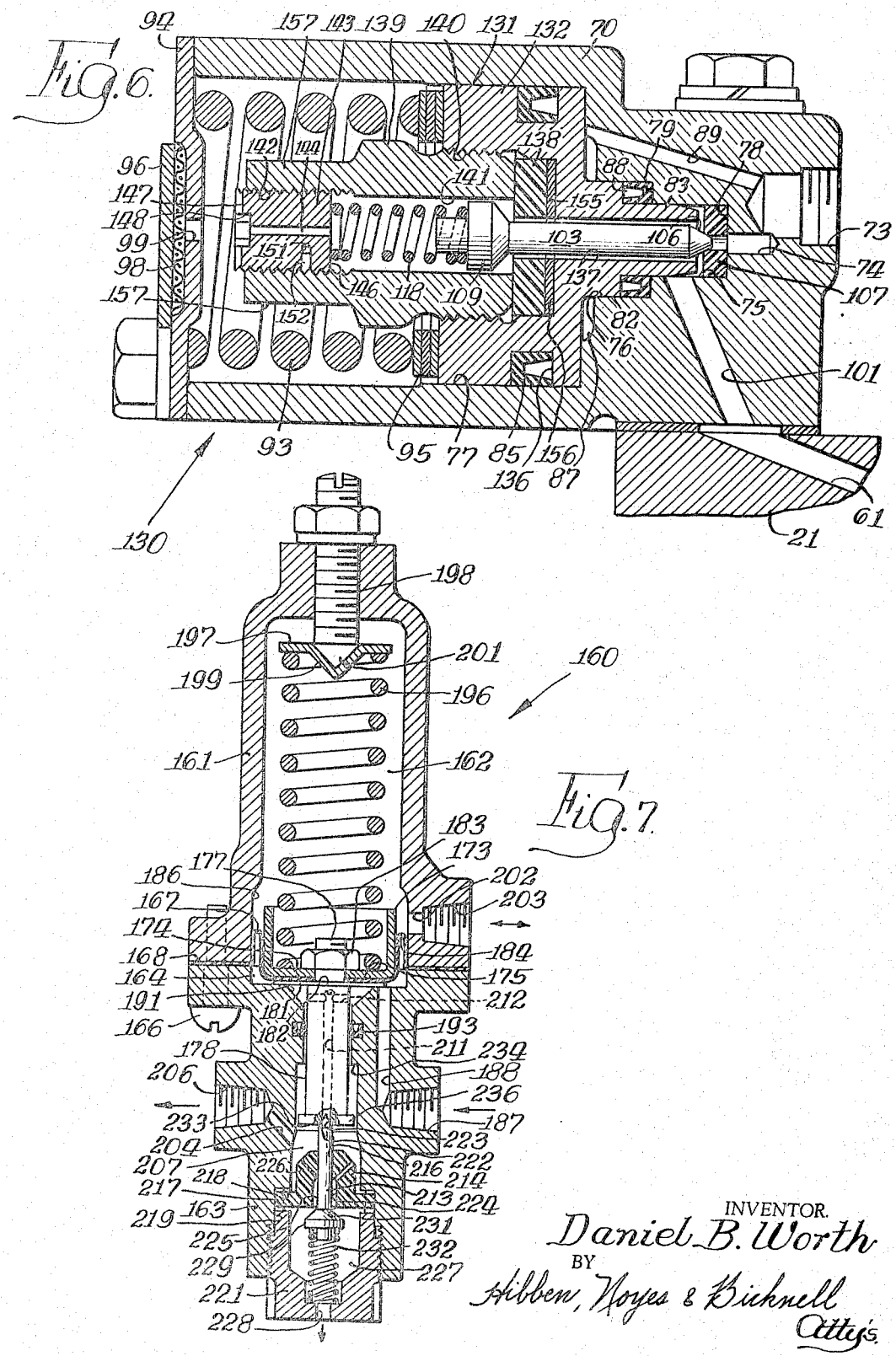

3,316,926
PRESSURE RESPONSIVE SUPPLY-EXHAUST VALVE
Daniel B. Worth, Columbus, Ind., assignor to Cummins Engine Company, Inc., Columbus, Ind., a corporation of Indiana
Filed Apr. 1, 1963, Ser. No. 269,480
6 Claims. (Cl. 137—102)

This invention relates generally to devices for controlling fluid pressure, and more particularly to a fluid pressure control device for use with a fluid reservoir supplied with fluid by a source of fluid under pressure, for maintaining the reservoir at a predetermined pressure.

It is a general object of the present invention to provide a novel device for controlling the pressure of fluid in a reservoir supplied with fluid from a source of fluid under pressure.

A more particular object is to provide a pressure control device for controlling an air compressor supplying air under pressure to a reservoir.

A further object is to provide a novel fluid pressure control device of the foregoing character, that is simple in construction and reliable in operation.

Another object is to provide a novel fluid pressure control device of the foregoing character that requires very little servicing and which may be easily adjusted and readily serviced when necessary.

These and other objects will become apparent from the following detailed description and the accompanying drawings in which:

FIG. 1 is a diagrammatic view of a fluid pressure system comprising a reservoir for fluid and a compressor for supplying fluid under pressure to the reservoir, and including a fluid pressure control device embodying the features of the invention;

FIG. 2 is a view of the fluid pressure control device, showing the device mounted on the cylinder head of an air compressor;

FIG. 3 is an elevational view of the fluid pressure control device, taken substantially along the line 3—3 of FIG. 2;

FIG. 4 is a sectional view taken along the line 4—4 of FIG. 2, and showing the parts of the fluid pressure control device and a portion of the air compressor in one operating position;

FIG. 5 is a view similar to FIG. 4 but showing the parts in another operating position;

FIG. 6 is an enlarged sectional view similar to FIG. 4, and showing an alternate construction of the fluid pressure control device, and FIG. 7 is a sectional view of another fluid pressure control device.

FIG. 1 diagrammatically illustrates, in block form, one application of an air governor or fluid pressure control device embodying the present invention. Thus, the present air governor is indicated generally at 10 and shown in operable relation with a fluid control valve such as unloader valve 11 for a source of fluid under pressure, in this instance, an air compressor 12. The compressor 12 has an intake 13 and discharge 14, the latter being connected to a tank or reservoir 15. When operable, the compressor 12 is effective to supply fluid under pressure, in this instance air, to the reservoir 15 under the control of the device 10 and to maintain the pressure in the reservoir within a given pressure range. The reservoir 15 includes a line 16 which is adapted to be connected to a device operated by air, such as the brake cylinders of an automotive vehicle for effecting a braking action when air under pressure is supplied to the cylinders. The connection 14 between the compressor 12 and the reservoir 15 may be provided with a check valve 17, and the reservoir 15 may be provided with a gauge 18.

It will be understood, however, that while the air governor of the present invention is illustrated as being adapted to control the output of an air compressor which supplies air under pressure to a reservoir, the instant device could also be used in other applications.

The air governor 10 is adapted to sense pressure changes in the reservoir 15 by means of an interconnecting conduit 19 and to selectively render the compressor 12 effective or ineffective through the action of the unloader valve 11 to supply additional fluid under pressure to the reservoir 15. The device 10 effects such control by causing the unloader valve 11 to selectively open or close the intake 13 of the compressor 12.

For accomplishing this, the unloader valve 11 includes a cover 21 providing a chamber 22 connected to the air governor 10 by a passage 23. The governor 10 is adapted to supply air at reservoir pressure to the chamber 22 to close the intake 13 and render the compressor 12 inoperable, or to vent the chamber 22 to atmosphere to open the intake 13 and render the compressor 12 operable. The unloader valve 11 includes a diaphragm in the form of an inverted cup 24 mounted in the intake passage of the compressor and having a portion thereof exposed to the pressure in the chamber 22. A coil spring 26 engages the cup 24 and normally urges the latter in a direction to open the intake 13 when the chamber 22 is at substantially atmospheric pressure, the cup 24 being movable in the opposite direction against the force of the spring 26 to close the intake 13 when the chamber 22 is subjected to the reservoir pressure.

In FIGS. 2, 4 and 5, the fluid pressure control device or air governor 10 is illustrated as being mounted on the cover 21, the latter being mounted on the cylinder head, indicated at 25, of the compressor 12. The unloader valve 11, in this instance, is mounted in a chamber 27 in the cylinder 25, and the intake 13 is formed in the cylinder head and communicates with the chamber 27. An intake and discharge valve assembly 29 is mounted in the chamber 27, and the unloader valve 11 is located above the assembly 29.

The valve assembly 29, in this instance, comprises a cup-shaped exhaust valve seat member 31 mounted in the chamber 27 and having a bottom wall 32 provided with a portion 33 of reduced diameter extending downwardly therefrom and defining a passage 34 opening into the cylinder of the compressor. The portion 33 is disposed in a bore 35 extending downwardly from the chamber 27. The chamber 27 is provided with an upwardly facing shoulder 36 on which a flange 37 at the upper end of the member 31 is seated.

The bottom wall 32 is provided with at least one opening 41 therethrough forming an exhaust port for the compressor. The port 41 opens into an annular chamber 42 around the member 31, and the chamber 42 communicates with the discharge 14 (see FIG. 1). An exhaust valve in the form of a flat ring 43 is located below the wall 32 to close the port 41 when the ring 43 is engaged with the lower surface of the wall 32. A coil spring 44 is mounted in an annular recess 45 below the ring 43 to normally urge the ring 43 upwardly toward a position closing the port 41. Thus, on the pumping stroke of the compressor piston, air under pressure in the cylinder will overcome the force of the spring 44 and unseat the ring 43 to thereby open the port 41 and permit air under pressure to flow through the discharge 14.

Mounted above the valve member 31 is an intake valve seat member 46. The member 46 includes at least one opening 47 therethrough, forming an intake port opening into the interior of the member 31. An intake valve in he form of a disk 48 having at least one opening 49 therethrough, preferably in its central portion, is mounted in the member 31 below the member 46, and a coil spring 51 is mounted on the wall 32 and urges the disk 48 upwardly into engagement with the member 46 to close the intake port 47. In order to hold the members 31 and 46 positioned in the chamber 27 and to provide a guide for the cup 24, the cover 21 includes, in this instance, a plurality of downwardly extending circumferentially spaced fingers 52 (FIGS. 2, 4 and 5) which engage the upper surface of the member 46.

Thus, on the suction stroke of the compressor, reduced pressure in the cylinder will overcome the force of the spring 51 and cause the intake valve disk 48 to move downwardly, thereby permitting air to flow from the intake 13 through the port 47 and passage 34 into the cylinder. The action of the spring 44 is effective to maintain the ring 43 engaged with the wall 32 and the exhaust port 41 closed at this time. On the up-stroke of the piston, air in the cylinder is compressed, and such pressure together with the action of the spring 51 causes the intake valve disk 48 to seat, closing the intake port 47, the pressure opening the exhaust port 41, as heretofore described. The cup 24 has a flange 54 and is slidably mounted in a seal 57, the latter being mounted in the cover 21. The cover 21 is recessed above the seal 57 to define the chamber 22 into which the cup 24 protrudes. The coil spring 26 has one end seated in the cup 24 and the other end engaged with the member 46 so as to normally urge the cup 24 upwardly or toward a position which does not restrict the intake 13.

When a predetermined pressure is reached in the reservoir 15, it is desirable to have the unloader valve 11 become effective to render the compressor 12 inoperable to supply additional air under pressure to the reservoir 15, even though the compressor is being driven. The foregoing is achieved through the action of the air governor 10 which serves to connect the chamber 22 with the reservoir 15 through the passage 23 and passages in the governor 10. When fluid pressure is applied to the chamber 22 by the governor 10, the cup 24 will be moved downwardly to the position illustrated in FIG. 5 and the flange 54 of the cup 24 seats on the member 46. Communication between the intake 13 and intake port 47 is thus interrupted and the compressor 12 is rendered inoperable to supply air under pressure to the reservoir 15. When the governor 10 cuts off pressure to the chamber 22 and relieves the pressure therein, the force of the spring 26 raises the cup 24 to the position illustrated in FIG. 4, whereupon the compressor 12 is again rendered operable to supply air under pressure to the reservoir 15.

As will be apparent from FIGS. 2, 4 and 5, the air governor 10 of the present invention is mounted on the cover 21 of the unloader valve 11 and comprises a generally cylindrical housing or hollow body 70 providing a chamber 71 and having a closed end 72. The closed end 72, in this instance, includes a threaded bore 73 which is intersected at its inner end by a smaller bore 74 extending axially inward in the housing 70. The bore 73 comprises an inlet and is connected to the reservoir 15 by the conduit 19. The bore 74 is connected at its inner end with a series of concentric counterbores indicated at 75 and 76 extending from the chamber 71, the counterbores defining shoulders 78 and 79. The chamber 71 is enlarged somewhat toward the open end of the housing 70.

Slidably mounted within the housing 70 is pressure responsive means in the form of a piston, indicated generally at 81, having stepped-down portions 82 and 83 of reduced diameter and extending axially from the forward or inlet face of the piston 81. The portions 82 and 83 are substantially equal in diameter to the diameters of the respective counterbores 76 and 75. An annular V-type packing seal 84 may be disposed around the portion 83 and seated against the shoulder 79, and another annular V-type packing seal 85 is carried in circumferential groove 86 in the piston 81 to prevent fluid leakage around the piston. The inner face of the end wall 72 is recessed to define a space 87 between the piston 81 and the end wall 72, and a space 88 is provided between the end face of the portion 82 and seal 84. The spaces 87 and 88 are adapted to receive air under pressure from the reservoir 15, for moving the piston 81 toward the left, by means of a first passage 89 connecting the inlet 73 with the space 87 and the chamber 71, air passing between the portion 82 and bore 76 into the space 88.

The rearward or low-pressure side of the piston 81 includes a first portion 90 of reduced diameter defining a shoulder 91, and a second portion 92 of reduced diameter extending axially toward the open end of the housing 70. The portion 90 provides an annular guide surface for supporting one end of a coil spring 93 which bears against the shoulder 91 on the piston 81 and which tends to move the piston toward the inlet 73. The opposite end of the spring 93 engages a closure plate 94 secured to the open end of the housing 70. In order to permit adjustment of the force exerted by the spring 93 on the piston 81 and hence of the pressure at which the device 10 will become effective to actuate the unloader valve 11, one or more shims in the form of washers 95, may be interposed between the spring 93 and shoulder 91. The closure plate 94 is held in place against the end of the housing 70 by a strap 96 (see FIGS. 3, 4 and 5) extending angularly across the closure plate 94 and fastened to the housing 70 as by bolts 97 extending through the strap 96 and closure plate 94 and threaded into the housing 70. The closure plate 94 is centrally indented on its outer face to receive a screen 98 held in place by the strap 96. The closure plate 94 is provided with a central opening 99 underlying the screen 98 to permit pressure fluid to drain therethrough to the atmosphere.

In order to provide for the selective communication of compressed air at reservoir pressure to the chamber 22 to actuate the unloader valve 11, the housing 70 includes a fluid outlet in the form of an angularly extending bore 101. The bore 101 is connected at one end with the passage 23 in the unloader valve housing 21 and at its other end with a chamber 102 defined in the counterbore 75 between the end face of the portion 83 of the piston 81 and the shoulder 78. The bore 74 and chamber 102 thus comprise a second passage connecting the inlet 73 with the outlet 101.

In order to provide for the selective opening and closing of the second passage and hence the application of reservoir pressure to the chamber 22 of the unloader valve 11, the governor 10 includes valve means in the form of a plunger 103. The plunger 103 is elongated and is loosely mounted in a central axial bore 104 in the piston 81, coaxial with the passage 74. The right end of the plunger 103, as shown in FIGS. 4 and 5, is preferably tapered as at 106 to form a valve closure engageable with an annular valve seat 107 mounted in the counterbore 75 against the shoulder 78. The valve seat 107 and the valve closure 106 comprise first valve means for controlling the flow of fluid through the second passage.

In order to permit selective draining of the chamber 22 of the unloader valve 11 and thus permit the compressor 12 to supply air under pressure to the reservoir 15, the governor 10 includes second valve means operable when open to drain pressure fluid from the outlet 101 and the chamber 22 of the unloader valve 11. In the present instance, fluid can flow through the bore 104 because of the loose fit of the plunger 103 therein. The bore 104 is connected to a larger bore 108 and the second valve means is located in the larger bore 108. Thus, the second valve means comprises an enlarged head or closure 109 on the plunger 103, which cooperates with a valve seat 111 located in the end of the larger bore 108 where it connects with the bore 104. The larger bore 108 is closed at the outer end of the piston 81 by a plate 113 secured in place in the bore 108 by a snap ring 116 and having a central opening 117 communicating with the interior of the housing 70.

The first valve means is adapted to be opened to admit pressure fluid from the inlet 73 to the outlet 101 when the piston 81 moves to the left by virtue of the pressure from the inlet 73 acting against the piston to shift it to the left as shown in FIGS. 4 and 5. When the first valve means is open, the second valve means must be closed in order to build up pressure in the chamber 22 of the unloader valve 11. Thus, the piston 81 moves the valve seat 111 into engagement with the valve closure 109 to close the second valve means, and further movement of the piston 81 then moves the valve closure 106 out of engagement with the seat 107 to open the first valve means. The valve closure 109 is held against the seat 111, as shown in FIG. 5, by a spring 118 bearing at one end against the valve closure 109 and at its other end against the plate 113.

With the piston 81 in its extreme right position as shown in FIG. 4, when the pressure in the reservoir 15 reaches the desired maximum value, such pressure is applied to the chamber 71 at the right side of the piston. Such pressure is applied to that part of the piston outside of the portion 82 and to that part facing the shoulder 79, leakage being permitted between the counterbore 76 and the stepped-down portion 82 of the piston 81. The pressure, however, is not at this time applied to the end face of the portion 83 of the piston because of the presence of the seal 84. The spring 93 is such that the maximum desired pressure in the reservoir 15 will overcome the force exerted by the spring 93 and move the piston 81 toward the left. Such movement first causes the second valve means, comprising the closure 109 and the seat 111, to close and thereafter causes the first valve means, comprising the closure 106 and seat 107, to open. Pressure fluid from the reservoir 15 thus passes from the inlet 73 through the second passage 74 to the outlet 101. Such pressure is now applied to the end face of the portion 83 of the piston 81 so that the force tending to move the piston to the left is increased and movement of the piston to its extreme left position as shown in FIG. 5 is assured.

With reservoir pressure applied to the chamber 22, the cup 24 is forced downwardly to shut off the intake of the compressor. The compressor thus delivers no air to the reservoir 15.

When air is withdrawn from the reservoir due to operation of the device or devices connected thereto, the pressure in the reservoir falls. When the drop in such pressure becomes less than that necessary to hold the piston in its left position shown in FIG. 5, the spring 93 causes the piston to move toward the right until the valve closure 106 on the end of the plunger 103 engages the seat 107. The length of the valve plunger 103 is such that the first valve means is closed in this manner before the piston moves to its extreme right hand position. During further movement of the piston to the right, the spring 118 holds the plunger 103 tightly seated against the seat 107. Closure of the first valve means shuts off the supply of fluid pressure to the chamber 22 of the unloader valve 11. Further movement of the piston toward the right causes the second valve means, comprising the closure 109 and seat 111, to open. Thus, the pressure fluid in the chamber 22, outlet 101 and chamber 102 can drain through the clearance between the plunger 103 and its bore 104, through the second valve means and thence to atmosphere through the bore 108 and openings 117 and 99 in the plates 113 and 94, respectively. Drainage of the pressure fluid from the chamber 102 decreases the force acting against the spring 93 since pressure is no longer applied to the end face of the portion 83 of the piston. Thus, the spring 93 will force the piston 81 into engagement with the closed end 72 of the housing 70.

With the pressure in the chamber 22 of the unloader valve 11 thus relieved, the cup 24 will be lifted by the spring 26 so that the compressor may then draw air through its intake 13. The compressor will then supply air to the reservoir 15 until the pressure in the latter rises to the predetermined maximum value and the governor again functions to actuate the unloader valve 11 and shut off the flow of air from the compressor to the reservoir.

In FIG. 6, another air governor or fluid pressure control device 130 is illustrated. The air governor 130 is substantially identical to the air governor 10, except as to construction of its pressure responsive means or slidable piston, indicated generally at 131. Consequently, the various parts of the governor 130, which are identical to those of the governor 10 have been identified with the same reference numerals.

The piston 131 differs from the piston 81 of the governor 10 in that the former employs a two-piece construction which facilitates adjustment of the position of the valve seat cooperating with the enlarged head or closure 109 of the second valve means. The piston 131 thus comprises a first portion 132 which is cup-shaped and is slidably mounted in the bore of the housing 70, with the open end of the first portion disposed toward a closure plate 94.

A coil spring 93 is mounted in the housing 70, for urging the piston 131 toward the inlet 73. One end of the spring 93 bears against the left end face of the portion 132 of the piston, the opposite end of the coil spring 93 engaging the closure plate 94. The closure plate 94 includes an opening 99, which connects the interior of the housing 70 at the left side of the piston 131 with the atmosphere, and a screen 98 may be provided at the rear or outer side of the plate 94 to prevent foreign material from entering the interior of the housing 70 through the opening 99. Adjustment of the force of the coil spring 93 on the piston 131 and hence the pressure at which the piston will be moved and the governor 130 will become effective to close the unloader valve 11 is achieved by interposing one or more shims in the form of washers 95 between the spring 93 and the end face of the portion 132.

The inner or right end of the portion 132, as in the previously described form, is provided with stepped-down portions 82 and 83 extending axially toward the inlet 73, such portions being respectively received in counterbores 76 and 75 in the closed end 72 of the housing 70. An annular V-type packing seal 84 is disposed around the portion 83, and another V-type packing seal 85 is carried in a circumferential groove 136 in the portion 132 to prevent fluid leakage. The first portion 132 also includes a central axially extending bore 137, coaxial with an inlet bore 74 in the closed end of the housing 70, for loosely receiving the plunger 103. The right end, indicated at 106, of the plunger 103 is tapered to provide a valve closure which coacts with the annular valve seat 107 mounted in the counterbore 75, the tapered end 106 and the valve seat 107 comprising first valve means. The left end of the plunger 103 is enlarged as at 109 to provide a valve closure which cooperates with an annular valve seat 138, the enlarged end 109 and valve seat 138, comprising second valve means.

The piston 131 also includes a second portion in the form of a tubular member 139 threaded as at 140 into the first portion 132. The inner cylindrical surface, indicated at 141, of the tubular member 139 is coaxial with the bore 137 in the first portion 132 and is somewhat larger than the diameter of the head 109 to permit free sliding movement of the latter therein. The outer end, indicated at 142, of the inner surface 141 is threaded to receive a retainer in the form of a plug 143 having a central axial bore 144 therethrough. The inner end face, indicated at 146, of the plug 143 provides an abutment for one end of the coil spring 118 mounted within the tubular member 139. The other end of the coil spring 118 engages the head 109 of the plunger 103 to urge the lunger toward the right and the valve closures 106 and 109 toward their respective seats 107 and 138. The outer end face of the plug 143 may be recessed to provide a slot 147 for a screw driver and a hexagonal socket 148 for receiving a wrench to permit adjustment of the axial position of the plug 143. The plug 143 may also include a short radial bore 151 extending inwardly from the outer diameter thereof for receiving locking means in the form of a plug 152 which frictionally engages the threads of the outer end 142.

Assuming that a certain number of shims 95 have been interposed between the piston portion 132 and the coil spring 93 to establish a desired reservoir pressure at which the piston 131 will start to move toward the left, it may be found that the plunger 103 does not move off of its seat 107 quickly enough and that the unloader valve 11 remains open longer than desired. Such action may cause the pressure in the reservoir 15 to rise above a desired upper limit. This may be avoided by having the valve seat 138 engage the head 109 of the plunger 103 at an earlier point in the movement of the piston 131 toward the left as viewed in FIG. 6. To this end, shims 155 may be placed between the seat 138 and the inner end face, indicated at 156, of the portion 132. The addition or removal of the shims 155 also controls the point in the movement of the piston 131 toward the left at which the tapered portion 106 of the plunger 103 will separate from its seat 107 and consequently the point at which pressure is supplied to the unloader valve 11 to stop further delivery of fluid to the reservoir.

Also, assume that a number of shims 155 have been placed between the seat 138 and the inner end face 156 of the portion 132 of the piston. When the pressure in the reservoir reaches the desired lower limit, the piston will begin to move toward the right under the pressure of the spring 93. The presence of the shims 155 may hold the plunger 103 off of its seat 107 for too long a time so that the pressure in the reservoir may fall below the desired lower limit. To avoid this, one or more of the shims 155 may be removed to permit the plunger to contact the seat 107 at an earlier point in the movement of the piston and thus prevent the pressure in the reservoir from falling, to any great extent, below the desired lower limit. Whether shims 155 are added or removed will be determined by whether the upper limit or the lower limit of the pressure in the reservoir is the more critical for the devices supplied therefrom. The governor 130 in all other respects functions in the same manner as the governor 10.

In FIG. 7, another air governor or fluid pressure control device 160 is illustrated, the latter comprising a hollow body in the form of a cylindrical hollow housing portion 161 providing a chamber 162 therein having one end open, and a valve portion 163 having a chamber 164 therein connected to the open end of the housing portion 161 as by screws 166. Pressure responsive means in the form of a flexible, cup-shaped diaphragm 167 for actuating valve means within the valve portion 163 is mounted in the housing portion 161 with its marginal portion 168 clamped between the adjacent end faces of the housing portion 161 and valve portion 163. The diaphragm 167 thus separates the chamber 162 from the chamber 164. The diaphragm 167, in the present instance, is of a character which may be readily flexed to offer minimum resistance to movement thereof and is of a material which is air and liquid tight, as for example rubber coated fabric.

In order to support the diaphragm 167, a cup-shaped member 173 is secured at its base or end wall 174 to the upper side of the central portion, indicated at 175, of the diaphragm 167. To this end, the base 174 of the cup 173 and the central portion 175 of the diaphragm 167 are mounted on the reduced upper end 177 of a plunger 178 extending into the valve portion 163 for actuating the valve means therein. A disk 181 may be provided under the central portion 173 of the diaphragm to hold it flat against the lower side of the member 173 and a nut 183 is threaded onto the reduced portion 177 to hold the parts assembled. Thus, longitudinal movement of the central portion 175 of the diaphragm 167 effects a corresponding movement of the plunger 178, such movement being accommodated by a rolling of the intermediate portion, indicated at 184, of the diaphragm 167 with very little resistance. The lower end of the inner wall of the housing portion 161 may be enlarged as at 186 to accommodate the rolled intermediate portion 184 of the diaphragm during movement of the plunger 178.

To actuate the diaphragm 167 and hence the plunger 178, the chamber 164 is adapted to receive pressure fluid from the reservoir 15. To this end, the valve portion 163 is provided with an inlet comprising a threaded bore 187 which is adapted to receive a pipe extending from the reservoir and which is intersected at its inner end by a longitudinal bore 188, the upper end of which opens into the chamber 164. In order to prevent fluid leakage between the plunger 178 and the bore in which it is mounted, a V-type packing seal 193 may be mounted in the valve portion 162 around the plunger. Thus, fluid under pressure from the reservoir is supplied to the chamber 164, the bores 187 and 188 comprising a first passage connecting the inlet with the chamber 164.

Mounted within the chamber 162 in the housing portion 161 is a coil spring 196 having its lower end seated against the base wall 174 of the cup member 173 and its upper end bearing against a support plate 197 which is held in an adjusted position against the upper end of the spring 196 by a screw 198 threaded into the upper end of the housing portion 161. The plate 197 may be provided with a central depression 199 for receiving a complementally shaped end portion 201 on the inner end of the screw 198. Thus, adjustment of the screw 198 serves to adjust the force exerted by the spring 196 on the cup member 173 and hence the pressure at which the device 160 will become effective to actuate the unloader valve 11. The housing portion 161 may be provided with a bore 202 to connect the chamber 162 with the atmosphere to prevent any build-up of pressure within the chamber 162 on movement of the diaphragm 167. The outer end, indicated at 203, of the bore 202 may be threaded for connection with a filter or air cleaner to prevent the entry of foreign particles into the chamber 162.

In order to connect the chamber 164 with the unloader valve 11, the valve portion 163 includes a fluid outlet in the form of an angularly extending bore 204, the outer end of which is threaded, as at 206, to receive a pipe connected to the chamber 22 of the unloader valve 11. The inner end of the bore 204 communicates with a second chamber 207 formed by an enlarged bore in the valve portion 163. A central longitudinal bore 211 is provided in the plunger 178, the bore 211 extending upwardly from the chamber 207 and intersecting, at its upper end, a transverse bore 212 disposed somewhat below the diaphragm 167 and opening into a conical recess 191 formed in the valve portion 163. The bores 212 and 211 and chamber 207 thus comprise a second passage connecting the inlet 187 with the outlet 204.

To provide for the selective opening and closing of the second passage and hence the application of reservoir pressure to the chamber 22 of the unloader valve 11, the governor 160 includes first valve means in the form of a second plunger 213. The plunger 213 is elongated and slidably mounted in an inverted cup-shaped guide member 214 mounted in the lower end of the second chamber 207. The guide member 214 preferably is of nylon and includes a central axial bore 216 for slidably receiving and maintaining the plunger 213 in axial alignment with the bore 211 in the plunger 178. The guide member 214 is held in place in the valve portion 163 by a circumferential flange 217 of the member 214 clamped against a shoulder 218, defined by a counterbore 219 at the lower end of the chamber 207, by means of a plug 221 threaded into the lower end of the counterbore 218. Annular seal means may be disposed on the upper and lower end faces of the flange 217.

The upper end of the plunger 213 is tapered as at 222 to form a valve closure engageable with the flared lower end, indicated at 223, of the bore 211, the latter forming a valve seat for the tapered end 222. The tapered end 222 and flared end 223 thus comprise first valve means for controlling the flow of fluid through the second passage.

In order to drain the chamber 22 of the unloader valve 11 and thus permit the compressor 12 to supply air under pressure to the reservoir 15, the governor 160 includes second valve means operable when open to drain pressure fluid from the outlet 204. To this end, the lower end of the bore 216 which slidably receives the plunger 213 is counterbored as at 224 to define an annular space 225 around the plunger 213, and a plurality of inclined bores or passages 226 are provided in the guide member 214 for connecting the second chamber 207 with the annular space 225. The space 225 communicates with a chamber 227 defined by the interior of the plug 221, and the chamber 227 communicates with the atmosphere by means of a longitudinal passage 228 formed in the end wall of the plug 221. Thus, fluid from the chamber 22 of the unloader valve 11 can flow in a reverse direction through the outlet 204 to the second chamber 207 and thence through the passages 226 and annular space 225 to the chamber 227, from which it may vent to the atmosphere through the passage 228.

For selectively connecting the annular space 225 with the chamber 227, the second valve means is provided. Such second valve means, in the present instance, comprises an enlarged head or closure 229 formed on the lower end of the plunger 213 and cooperating with a valve seat 231 formed by the lower end of the counterbore 224. A coil spring 232 is disposed between the plunger 213 and inner end face of the plug 221 to urge the plunger 213 upwardly or toward the plunger 178 and thus to urge second valve closure 229 toward its seat 231 as well as to urge the end 222 of the plunger 213 toward its seat 223.

The first valve means 222, 223 and the second valve means 229, 231, of the governor 160 function in the same manner as their counterparts in the previous embodiments. Thus, as the diaphragm 167 and the plunger 178 begin to move upwardly the second plunger 213 also moves upwardly due to the action of the spring 232. The first valve means 222, 223 remain closed until the closure 229 moves into engagement with its seat 231 to close the second valve means. Further movement of the plunger 178 causes the valve seat 223 at the lower end of the bore 211 to move away from the tapered end 222 of the first valve means to open the latter. At this time, pressure from the reservoir is communicated through the connected bores 212 and 211 to the second chamber 207 to supply pressure fluid to the unloader valve 11. Pressure fluid is also applied to the lower end face, indicated at 233, of the plunger 178. Such pressure acting on the additional area of the end face 233, that is the annular area between the bore 211 and periphery of the plunger 178, causes a rapid upward movement of the plunger 178. Such movement is limited by engagement of a shoulder 234 formed in the bore for the plunger 178 and a flange 236 formed around the lower end of the plunger 178.

With the plunger 178 in its extreme up position, pressure from the reservoir passes through the various connected passages in the valve portion 163 of the governor 160 and is then communicated to the chamber 22 of the unloader valve 11. The diaphragm 24 of the unloader valve is thus forced downwardly to shut off the intake of the compressor, and the compressor will thus be prevented from delivering air to the reservoir 15 even though the compressor is being driven.

As air is withdrawn from the reservoir because of the operation of associated devices connected thereto, the pressure in the reservoir will drop. When the pressure in the chambers 164 and 207 falls to such a value that the force exerted thereby on the diaphragm 167 and effective area of the lower end face 233 of the plunger 178 is no longer sufficient to oppose the force of the spring 196, the latter will shift the cup 173 and consequently the diaphragm 167 and the plunger 178 downwardly. Such movement will continue until the tapered upper end 222 of the first valve means seats in the lower end 223 of the plunger bore 211. Continued downward movement of the plunger 178 then opens the second valve means by unseating the second closure 229 from its seat 231. Such action will permit pressure fluid in the chamber 22 of the unloader valve to vent through the various passages in the lower end of the valve portion 163 to atmosphere. Such action also relieves the pressure acting against the lower end face 233 of the plunger 178 and thereby decreases the force acting against the spring 196. With the pressure in the chamber 22 relieved, the diaphragm 24 will be lifted by the spring 26, as previously described, to permit the compressor to again draw air through its intake 13 and supply air to the reservoir 15. Such action will continue until the pressure in the reservoir again rises to the predetermined maximum value and the governor 160 again functions to actuate the unloader valve 11.

I claim:

1. An air governor for controlling a source of fluid under pressure for maintaining a reservoir connected to said source at a predetermined pressure, comprising:
    (a) a hollow body having a chamber and an inlet adapted to be connected to said reservoir and a first passage connecting said inlet and said chamber,
    (b) a piston mounted in said chamber and subjected to pressure from said inlet for moving said piston in one direction, said piston including a first portion slidably mounted in said hollow body and a second portion removably engaged with said first portion,
    (c) spring means tending to move said piston in the opposite direction,
    (d) said hollow body having an outlet adapted to be connected to said source for controlling the flow of pressure fluid from the latter to said reservoir,
    (e) said body also having a second passage connecting said inlet and said outlet,
    (f) first valve means for controlling pressure fluid flow through said second passage and adapted to be opened by movement of said piston in said one direction and to be closed when said piston moves in said opposite direction to prevent flow from said inlet to said outlet,
    (g) second valve means for draining pressure fluid from said outlet,
    (h) said second valve means being adapted to be closed when said first valve means is opened and to be opened when said first valve means is closed to drain pressure fluid from said outlet,
    (i) means interposed between said first and second portions of said piston to adjust the point of opening and closing of said first and second valve means relative to movement of said piston,
    (j) said first portion of said piston having a bore therethrough,
    (k) a plunger slidably mounted in said bore,
    (l) said first valve means comprising a valve seat mounted in said body for engagement by one end of said plunger, and
    (m) said second valve means comprising a valve seat mounted in said first portion of said piston for engagement by the other end of said plunger and being held in said first portion by said second portion,
    (n) said means interposed between said first and second portions of said piston comprising one or more shims interposed between said valve seat of said second valve means and said first portion.

2. An air governor according to claim 1, in which:
(a) said second portion of said piston comprises a tubular member threaded into said first portion, and
(b) said valve seat of said second valve means is clamped between the end of said tubular member and said first portion.

3. An air governor according to claim 2, in which a plug is threaded into the outer end of said tubular member, and second spring means is mounted in said tubular member in engagement with said plug and said plunger for urging said plunger in a direction to close both of said valve means, said plug being adjustable in said tubular member to adjust the pressure of said second spring means on said plunger.

4. An air governor according to claim 3, in which said plug has a bore therethrough communicating with the interior of said tubular member to permit pressure fluid to drain from said outlet through said second valve means and said plug.

5. An air governor for controlling a source of fluid under pressure for maintaining a reservoir connected to said source at a predetermined pressure, comprising:
(a) a hollow body having a chamber and an inlet adapted to be connected to said reservoir and having a first passage connecting said inlet and said chamber,
(b) pressure responsive means mounted in said chamber and subjected to pressure from said inlet for moving said pressure responsive means in one direction,
(c) spring means tending to move said pressure responsive means in the opposite direction,
(d) said hollow body having an outlet adapted to be connected to said source for controlling the flow of pressure fluid from the latter to said reservoir,
(e) said body also having a second passage connecting said inlet and said outlet,
(f) first valve means including a valve seat mounted in said body and a valve closure slidably carrier by said pressure responsive means for controlling pressure fluid flow through said second passage, said first valve means being opened by movement of said pressure responsive means in said one direction and closed when said pressure responsive means moves in said opposite direction preventing flow from said inlet to said outlet,
(g) second valve means for draining pressure fluid from said outlet,
(h) said second valve means being interconnected with said first valve means and being closed when said first valve means is opened and opened when said first valve means is closed to drain pressure fluid from said outlet,
(i) said second valve means comprising a valve seat mounted in said pressure responsive means and a valve closure connected to the valve closure of said first valve means and movable therewith,
(j) said pressure responsive means having a plunger slidably mounted therein,
(k) the valve closure of said first valve means being formed on one end of said plunger and the valve closure of said second valve means being formed on the other end of said plunger,
(l) second spring means bearing against said valve closure of said second valve means and tending to urge both of said valve closures toward their respective valve seats,
(m) said pressure responsive means having a bore loosely receiving said plunger,
(n) said bore having an enlarged portion for receiving said valve seat and said valve closure of said second valve means, and
(o) said second spring means being mounted in said enlarged portion and bearing at one end against the valve closure of said second valve means.

6. An air governor according to claim 5, in which said pressure responsive means has a retainer for supporting the other end of said second spring means, said retainer having an opening for draining fluid from said outlet.

References Cited by the Examiner

UNITED STATES PATENTS

| | | | |
|---|---|---|---|
| 1,747,910 | 2/1930 | Siefarth | 137—107 |
| 2,320,763 | 6/1943 | Trautman | 137—116 |
| 2,507,384 | 5/1950 | Schneck | 137—102 XR |
| 2,571,311 | 10/1951 | Trevaskis | 137—102 |
| 2,679,854 | 6/1954 | Stevenson | 137—102 |
| 2,717,612 | 9/1955 | Affleck | 137—102 |
| 2,771,898 | 11/1956 | Rotter | 137—107 |

ALAN COHAN, *Primary Examiner.*

WILLIAM F. O'DEA, *Assistant Examiner.*